(12) United States Patent
Funke et al.

(10) Patent No.: US 9,944,143 B2
(45) Date of Patent: Apr. 17, 2018

(54) SPRING PAD FOR VEHICLE SUSPENSION

(71) Applicant: Ford Global Technologies, LLC, Deaborn, MI (US)

(72) Inventors: Juergen Funke, Leverkusen (DE); Andreas Carlitz, Stolberg (DE); Paul Godesberg, Cologne (DE); Jason Paulding, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/401,006

(22) Filed: Jan. 7, 2017

(65) Prior Publication Data

US 2017/0197483 A1 Jul. 13, 2017

(30) Foreign Application Priority Data

Jan. 8, 2016 (DE) ........................ 10 2016 200 142

(51) Int. Cl.
*B60G 11/16* (2006.01)
*F16D 1/12* (2006.01)
*F16F 1/12* (2006.01)
*B60G 11/14* (2006.01)

(52) U.S. Cl.
CPC .............. *B60G 11/16* (2013.01); *B60G 11/14* (2013.01); *F16F 1/126* (2013.01); *B60G 2202/12* (2013.01); *B60G 2204/124* (2013.01)

(58) Field of Classification Search
CPC ......... F16D 1/122; F16D 1/126; B60G 11/14; B60G 11/16; B60G 2202/12; B60G 2202/312; B60G 2204/124; B60G 2204/1242; B60G 2204/12422

USPC ......... 267/170, 177, 178, 286, 287, 33, 248, 267/255

See application file for complete search history.

(56) References Cited

U.S. PATENT DOCUMENTS

| | | | | |
|---|---|---|---|---|
| 315,834 | A * | 4/1885 | Randall | B60G 11/52 267/33 |
| 446,203 | A * | 2/1891 | Cochennour | B60G 11/16 267/179 |
| 1,344,579 | A * | 6/1920 | Cartasso | B60B 9/28 152/101 |
| 2,356,962 | A * | 8/1944 | Williams | B61F 5/125 105/198.7 |
| 4,778,162 | A | 10/1988 | Borlinghaus | |
| 5,823,518 | A | 10/1998 | Nagamitsu et al. | |
| 6,578,836 | B2 | 6/2003 | Kogure et al. | |
| 7,490,818 | B2 | 2/2009 | Kato et al. | |

(Continued)

FOREIGN PATENT DOCUMENTS

DE 10009136 A1 8/2001
DE 102005002231 B4 * 4/2010 ............. B60G 11/16

(Continued)

*Primary Examiner* — Thomas J Williams
(74) *Attorney, Agent, or Firm* — Burgess Law Office, PLLC; Raymond L. Coppiellie

(57) ABSTRACT

A spring pad arranged between a terminal winding of a helical spring of a vehicle wheel suspension. The winding defines a rolled spring end. A spring plate supports the helical spring. The spring pad having a layered structure having two layers different in their rigidity. The first layer has a higher rigidity than the second layer. The first layer is an outer layer of the layered structure that may engage the terminal winding of the helical spring.

12 Claims, 2 Drawing Sheets

(56) References Cited

U.S. PATENT DOCUMENTS

| | | | |
|---|---|---|---|
| 7,562,888 B2 | 7/2009 | Orimoto et al. | |
| 8,061,690 B2 * | 11/2011 | Desprez ................ | B60G 11/16 267/152 |
| 2000/8002288 | 1/2008 | Palinkas | |

FOREIGN PATENT DOCUMENTS

| | | |
|---|---|---|
| DE | 102013009637 A1 | 12/2014 |
| DE | 202015106336 I1 | 11/2015 |
| FR | 2799693 A1 | 4/2001 |
| GB | 527468 A | 10/1940 |
| KR | 100828788 B1 | 5/2008 |

\* cited by examiner

SPRING PAD FOR VEHICLE SUSPENSION

CROSS-REFERENCE TO RELATED APPLICATIONS

Not Applicable.

BACKGROUND OF THE INVENTION

1. Field of the Invention

The invention relates to a vehicle wheel suspension and, more specifically, to a spring pad positioned between a spring and spring plate.

2. Description of Related Art

Motor vehicles typically have a wheel suspension system reducing oscillation transmission from a road surface to the vehicle occupants. Such suspension systems often have one or more shock absorbers, suspension struts or springs and combinations thereof. A helical spring with a purely axial force action is one type of spring used in vehicle suspensions. There are special helical springs that, besides producing tensile or pressing forces in an axial direction, produce forces in a lateral direction. For example, such springs are used with McPherson suspension struts to reduce friction on the sliding guides of the shock absorber by using force acting in a lateral direction of the helical spring. Lateral force action can also be achieved using a lower spring plate, not fitted concentrically relative to the suspension strut against which the helical spring on the suspension strut is supported, but instead with a lateral offset on the suspension strut.

Spring plates are used with helical springs to insure a correct fit of the terminal winding of the helical spring. Generally, the spring plate carries out an outer or inner centering of the spring end of the respective helical spring. Depending on whether the helical spring is constructed with a spring end, applied in a planar manner or a pitch end, a respective receiving region may also be constructed in the spring plate for this purpose. One problem is the accumulation of moisture and deposits of dirt in the support region of the helical spring. Because accumulations of dirt and moisture in this region lead to damage to a painted surface of the respective helical spring when the helical spring moves on the spring plate, increasing the risk of corrosion and spring fractures. Spring pads of a plastic material, conventionally formed of an elastomer material, are used to insulate the helical spring from the spring plate.

Generally, spring pads are not optimally adapted to the force distribution brought about by the geometry of the terminal winding which does not extend in a homogeneous manner in the peripheral direction of the winding. Partial overloads of the elastomer material may occur such that the resilient properties thereof become worse, often during operation of the vehicle, and lead to noises commonly perceived to be unpleasant by the vehicle occupants. The original action of force of the helical spring, determined by the configuration of the wheel suspension, for example a purely axial force action, cannot be maintained during operation.

SUMMARY OF THE INVENTION

A spring pad having two layers including a first layer having a higher rigidity than a second layer. The first layer having a thickness greatest at a peripheral portion of the spring pad diametrically opposite a peripheral portion of the spring pad provided for the abutment of a winding end of a terminal winding of a helical spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 3:
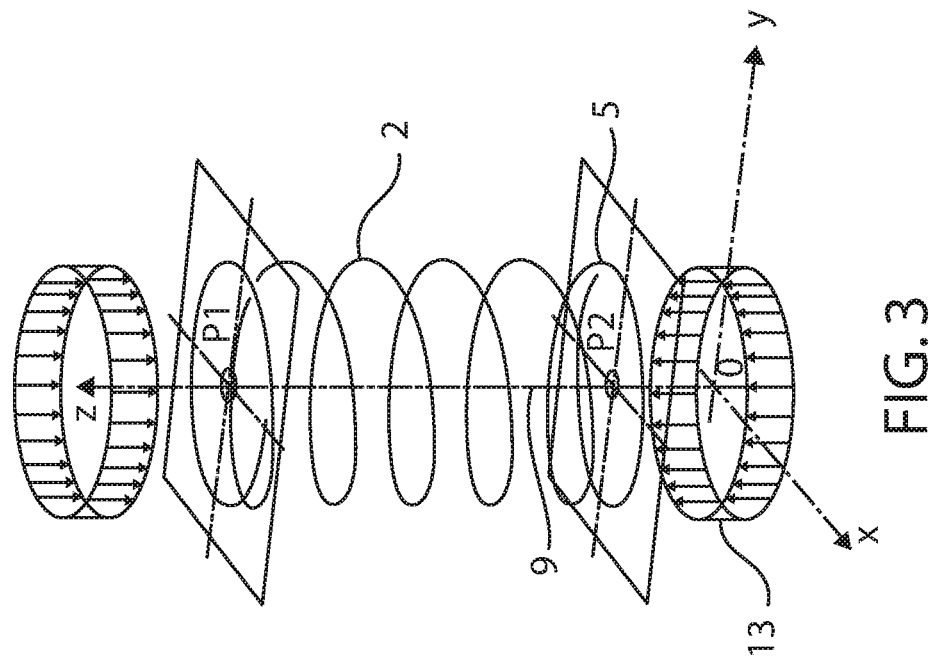
FIG. 3 is a schematic, three-dimensional view of a force distribution and associated force action line produced with a spring pad according to the invention.

The following description of the preferred embodiment(s) is merely exemplary in nature and is in no way intended to limit the invention, its application, or uses.

In the different figures, components, which are identical, are always given the same reference numerals, for which reason they are generally also only described once.

Figure 2:
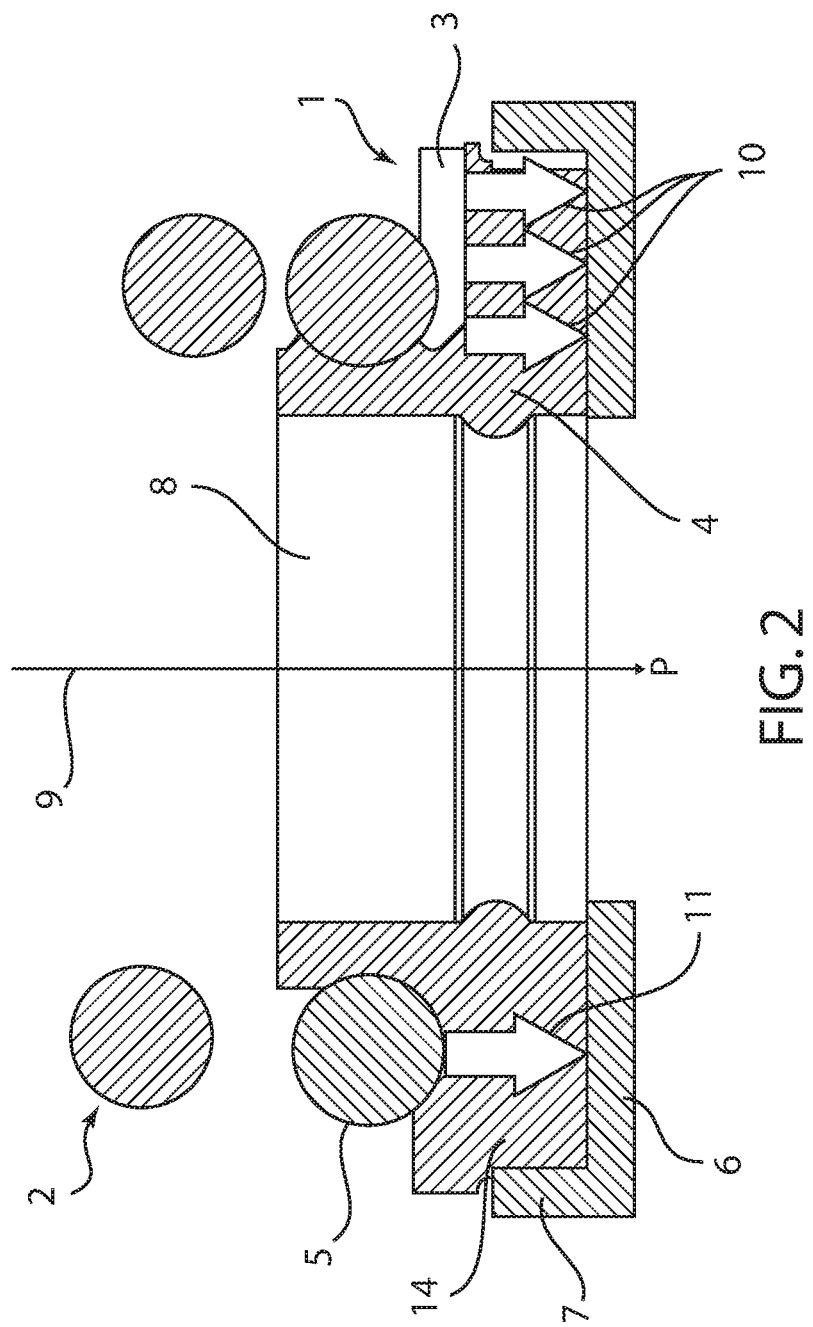
FIG. 2 is a detailed sectional view through a wheel suspension of a spring pad according to the invention.

FIG. 2 shows a wheel suspension including a spring pad 1 according one inventive embodiment. The wheel suspension includes a helical spring 2, wherein only the lower portion of the helical spring 2 is shown with the lower terminal winding 5. A spring pad 1 engages the spring end defined by the terminal winding 5, wherein the helical spring 2 is supported on a spring plate 6 associated with a wheel (not illustrated) of a motor vehicle.

The spring plate 6 has a peripheral support collar 7 receiving the spring pad 1 in a positive-locking manner in the spring plate 6. The spring pad 1 formed of a layered construction of two material layers, a first material layer 3 and a second material layer 4. Both material layers 3, 4 may be materially integral, for example, connected to each other by adhesive bonding. The first material layer 3 has a higher rigidity than the second material layer 4. The second material layer 4 forms a sleeve with a central aperture 8 for receiving a shock absorber, not illustrated.

The first material layer 3 may comprise, for example, a metal, plastic, or composite fiber material. The second material layer 4 may comprise elastomer material, for example, a rubber.

The second material layer 4 forms a complete peripheral protuberance 14 protruding radially from the outer side of the sleeve portion of the second material layer. The peripheral protuberance 14 positioned between the terminal winding 5 of the helical spring 2 and the spring plate 6. As illustrated at the left-hand side of FIG. 2 in peripheral portions of the spring pad 1 the second material layer 4 adjoins both the helical spring 2 and the spring plate 6.

The first, more rigid material layer 3 does not extend over the entire periphery along the protuberance 14. Instead, the first rigid material layer is positioned on only part of the periphery protuberance 14 of the spring pad 1 when viewed in the direction of the force action line 9. As illustrated in FIG. 2 the first material layer 3 is arranged adjacent to and between the terminal winding 5 of the helical spring 2 and the second material layer 4, however it does not extend over the entire circumference of the spring pad 1.

In addition, the first material layer 3 may extend radially from the sleeve portion to the periphery of the peripheral protuberance 14. The radial extent thereof, with respect to the resilient strength of the terminal winding 5, ensures lower pressure and more extensive introduction of force into the second material layer 4 as illustrated by the multiple arrows 10 in comparison with the single arrow 11 of the diametrically opposed peripheral portion, which does not have a first material layer 3. At the same time, it may be possible for the lower piercing location P of the force action line to be located on the geometric centerline of the helical spring 2.

Figure 1:
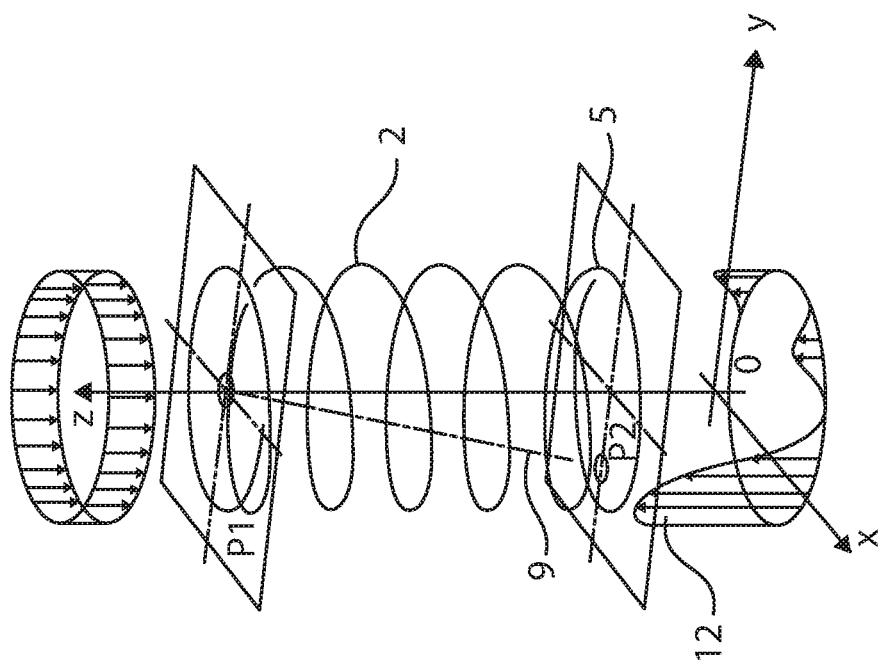
FIG. 1 is a schematic, three-dimensional view of a force distribution and associated force action line produced with a prior art spring pad.

Referring to FIGS. 1 and 3, the action of the spring pad 1 illustrated in FIG. 2 is shown in FIG. 3 compared with a prior art spring pad in FIG. 1.

FIG. 1 shows a force distribution 12 produced in a single-layer spring pad of elastomer material arranged between a lower terminal winding 5 of a helical spring 2 and a spring plate (not illustrated). In the peripheral direction the force distribution 12 has significant fluctuations so the force action line 9 has a lower piercing location P2, which in contrast to the upper piercing location P1 deviates from the geometric center line of the helical spring 2 to the detriment of the resilient action.

As shown in FIG. 1 the introduction of force at a peripheral portion of the force application diametrically opposite the end of the terminal winding 5 is high. The two-layer construction of the spring pad 1 is illustrated in FIG. 2, with the force application shown in FIG. 3. Because the first material layer 3 of rigid material is provided only over certain areas or portions, in particular in the regions of high application of force shown in FIG. 2, the force distribution 13 in the peripheral direction may be uniform and the lower piercing location P2 and the force action line 9 may be brought into alignment with the geometric center line of the helical spring 2.

As illustrated, the spring pad 1 is arranged between the helical spring 5 of a vehicle wheel suspension and a spring plate 6 supporting the helical spring 2. The spring pad 1 abutting arrangement between a terminal winding 5 of the helical spring 2, which winding defines a rolled spring end, and substantially has, for example, an annular shape.

The spring pad 1 includes a layered structure having two layers of material 3, 4 different in terms of their rigidity. The two layers of material 3, 4 differ in their respective rigidities, wherein the first material layer 3 has a greater rigidity than the second material layer 4. The term "rigidity" means a specific rigidity of the material used for the layer. For example, a torsional rigidity, determined among other things by the geometry of the layer, wherein reference is made thereto to determine the rigidity to a direction of action of force that corresponds to the path of the action of force of the helical spring 2. The resilience of the second material layer is greater than the resilience of the first material layer.

The first material layer 3 is associated with the terminal winding 5 of the helical spring 2 and arranged adjacent thereto, while the second, more resilient material layer 4 is associated with the spring plate 6, for example, arranged close beside or adjacent thereto.

The more rigid first material layer 3 ensures a force distribution, that is an expanded introduction of force, and consequently a lower pressure and reduced resilient deformation in the more resilient second material layer 4 located below the rigid first layer 3. Introduction of force by the helical spring 2 is not only applied more extensively in the more resilient material layer 3 below the spring 2 and it prevents local overloading directly below the winding 5. As shown, the more rigid material layer 3 above the more resilient layer 4 ensures dimensional stabilization and consequently permanent retention of the resiliently damping, oscillation-damping and noise-preventing properties of the spring pad 1.

Preferably, the second material layer 4 extends in the peripheral direction of the spring pad 1, while the first material layer 3 extends only partially in the peripheral direction of the spring pad 1 to partially adjust in a selective manner the resilient action of the second material layer 4 and/or to adjust the force action line of the helical spring 2. As illustrated, the second material layer 4 includes a sleeve with a central aperture and an annular protuberance extending or protruding radially outward. The first material layer 3 is a segment of the spring pad 1, arranged as quasi segment of or an inlay on the second material layer 4.

Preferably, the rigidity of the first material layer 3 is lower than the value of the spring steel used for the helical spring 2 to bring about with this material layer a damping of oscillations between the helical spring 2 and the spring plate 1. The first material layer 3 also protects the helical spring 2 from corrosion resulting from abrasion of the spring protection coating at the contact locations between the helical spring 2 and the spring pad 1.

The lower rigidity of the second material layer 4, preferably adjoining the spring plate 1, enables a damping of the forces and oscillations produced by the helical spring 2 preventing them from being introduced into a vehicle structure connected to the spring plate or a wheel suspension component connected to the spring plate, for example, a suspension strut, a shock absorber, a wheel guiding link, a wheel carrier and the like.

The first material layer 3 stabilizes the shape of the second material layer 4 by distributing force or loads in a uniform manner over the surface to prevent local overloads of the second material layer 4. Consequently, during long-term operation the first material layer 3 helps prevent changes of the spring pad 1 and a change of the action of force of the helical spring 2, in particular a change of the position of the piercing location P2. The piercing location P2 understood to be the location in the plane defined by the spring plate at which the line of application of force passes through this plane, see FIGS. 1 and 3.

The selection of the rigidity or resilience and/or the thickness of the first or second material layer 3, 4 of the spring pad 1 influences and predetermines the desired support and damping behavior of the helical spring/spring plate arrangement in an axial and lateral direction of the helical spring in a desired manner.

For example, the spring pad may be configured to enable both the transmission of forces acting in an axial direction of the helical spring between the helical spring and the spring plate and forces acting in the lateral direction of the helical spring that is the forces acting in a radial direction of the helical spring. The first more rigid material layer 3 reduces the movability of the second material layer 4 in a radial direction because of its inherent rigidity.

In one embodiment, the thickness of the first material layer 3 may vary in a peripheral direction of the rolled spring end. The thickness relates to a direction parallel with the geometric centerline of the helical spring 2. This variation may be non-constant that is disjointed. Variation of the thickness, for example, adapts the pressure path of the helical spring 2 in a peripheral direction in accordance with the geometry and pitch of the terminal winding 5 of the helical spring 2. Consequently the force path, generally not uniform from the terminal winding 5 of the helical spring 2, in the path direction of the winding can not only be "smoothed" by the spring pad, it also locates the piercing location P2 of the force action line 9 on the geometric center line of the helical spring 2 or approaches this line.

An embodiment provides for a thickness of the first material layer 3 to increase or decrease from a first peripheral portion to a diametrically opposed second peripheral portion. In addition, the contact face of the first material layer 3 adjoining the second material layer 4 is constructed not parallel, but instead inclined with respect to the contact face of the first material layer 3 adjoining the terminal winding 5. This enables the spring pad to be adapted to the geometry and the force distribution of the terminal winding 5.

A further embodiment includes the thickness of the first material layer 3 to be greatest in a peripheral portion of the spring pad 1 diametrically opposite the peripheral portion of the spring pad 1 provided for the abutment of the winding end of the terminal winding 5. This is because it has been determined that in the region of the winding end the pressure loading on the spring pad 1 is low and in the diametrically opposite region is high so that, in the latter, diametrically opposed peripheral portion, the first, more rigid material layer 3 is effective.

In another embodiment of the invention, the first more rigid material layer 3 is constructed from a metal material or plastic material, preferably a fiber-reinforced plastic material, so that, in comparison, a high level of rigidity is achieved.

In another embodiment, the second, more resilient material layer is formed from an elastomer material. Caoutchouc, rubber, or polyurethane are preferably used as elastomer materials for the second material layer 4.

The first material layer 3 may be loosely positioned on the second material layer 4. It is also possible for the first material layer 3 to be enclosed by the second material layer 4, wherein the enclosure may be constructed in such a manner that a support region of the first material layer 3 is free from an enclosure with respect to the terminal winding 5. Another embodiment connects the first material layer 3 to the second material layer 4 in a materially engaging manner. The two material layers 3, 4 may, for example, be adhesively bonded or vulcanized to each other, which ensures a uniform force distribution over the entire contact faces of the two material layers 3, 4. Further, the first material layer 3 may be embedded in the second material layer 4, for example, by means of over molding, which is similar to the above-mentioned enclosure, wherein an over molding free support region may also be provided. Because of the materially engaging connection, a uniform introduction of force is achieved, in particular in a radial direction of the spring pad 1 from one material layer into the other material layer.

In another embodiment of the spring pad 1, the radial extent of the first material layer 3 is greater than the resilient strength of the terminal winding 5 in the direction of this radial extent. The term "radial" refers to a direction perpendicular with respect to the geometric centerline of the helical spring 2. Because the first material layer 3 extends radially outward with respect to the terminal winding 5, a better, more uniform introduction of force into the second material layer 4 is achieved.

In another embodiment, the second material layer 4 engages, in a positive-locking manner, the spring plate 6 with respect to a lateral direction to prevent sliding of the spring pad 1 on the spring plate 6 in a lateral direction. For example, providing a positive-locking engagement of the second material layer 4 with a support collar 7, at least partially formed on the spring plate 7 at the periphery thereof, supports the spring pad 1 in a radial direction. Alternatively or additionally, the positive-locking connection between the spring plate 6 and the second material layer 4 can also be produced, for example, by a spring-plate-side projection, for example, a pin, engaging a corresponding recess of the second material layer, or vice versa. An inner centering of the spring plate may also produce a positive-locking connection between the spring plate and the first and/or second material layer.

As disclosed the spring pad 1 is suitable for use with a wheel suspension of a motor vehicle of the type using a helical spring supported against or on the spring plate. Wherein the spring pad is inserted or arranged between the spring plate and the helical spring. Regarding the advantages, effects and properties of the wheel suspension constructed in this manner, reference may be made to the above-described advantages, effects, and properties of the spring pad used with a wheel.

The spring pad of the disclosed embodiments is subjected to less wear, improves the force action line of the helical spring, and in particular ensures that the predetermined force action of the helical spring is maintained.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A spring pad comprising:
   at least two layers including a first layer having a higher rigidity than a second layer;
   said first layer having a thickness greatest at a peripheral portion of the spring pad diametrically opposite a peripheral portion of the spring pad provided for the abutment of a winding end of a terminal winding of a helical spring.

2. The spring pad of claim 1 wherein the second layer extends in a peripheral direction of the spring pad while the first layer extends only partially in the peripheral direction of the spring pad.

3. The spring pad of claim 1 wherein the first layer is constructed from a metal material, or a plastic material including a fiber-reinforced plastic material.

4. The spring pad of claim 1 wherein the second material layer is an outer material layer of a layered structure and engages a spring plate.

5. The spring pad of claim 1 wherein the first layer is an outer layer of a layered structure and engages the terminal winding of the helical spring.

6. The spring pad of claim 1 wherein the first layer extends radially outward and past the terminal winding in a radial direction.

7. The spring pad of claim 1 wherein the second layer is formed from an elastomer material.

8. The spring pad of claim 1 wherein the first layer and the second layer are connected to each other in a materially engaging manner.

9. The spring pad of claim 1 wherein the second layer engages a spring plate in a lateral direction.

10. A vehicle wheel suspension comprising:
a spring plate:
a helical spring having a terminal winding;
a spring pad between the spring plate and the helical spring, said spring pad having at least two layers including a first layer having a higher rigidity than a second layer; and
said first layer having a thickness greatest at a peripheral portion of the spring pad diametrically opposite a peripheral portion of the spring pad provided for the abutment of the winding end.

11. The vehicle wheel suspension of claim 10 wherein the second layer forms a radially protruding, peripherally extending protuberance, said protuberance circumferentially surrounding a central aperture of said spring pad in a peripheral direction of the spring pad; and
the first layer extending only partially about the central aperture of said spring pad in the peripheral direction of the spring pad.

12. The vehicle wheel suspension of claim 10 wherein the first layer is located under the terminal winding and extends radially outward and past the terminal winding in a radial direction.

\* \* \* \* \*